(12) United States Patent
Lorch

(10) Patent No.: US 7,080,790 B2
(45) Date of Patent: Jul. 25, 2006

(54) CARTRIDGE FOR SANITARY APPLIANCES

(75) Inventor: Werner Lorch, Schramberg (DE)

(73) Assignee: Hansgrohe AG, Schiltach (DE)

(*) Notice: Subject to any disclaimer, the term of this patent is extended or adjusted under 35 U.S.C. 154(b) by 0 days.

(21) Appl. No.: 10/381,470

(22) PCT Filed: Sep. 21, 2001

(86) PCT No.: PCT/EP01/10919

§ 371 (c)(1),
(2), (4) Date: Jun. 23, 2003

(87) PCT Pub. No.: WO02/25147

PCT Pub. Date: Mar. 28, 2002

(65) Prior Publication Data
US 2004/0011879 A1    Jan. 22, 2004

(30) Foreign Application Priority Data
Sep. 21, 2000  (DE)  .............................. 100 46 679

(51) Int. Cl.
*G05D 23/13* (2006.01)
(52) U.S. Cl. ................. 236/12.2; 137/625.41
(58) Field of Classification Search .... 236/12.1–12.22; 137/625.41, 625.4; 251/301
See application file for complete search history.

(56) References Cited

U.S. PATENT DOCUMENTS

| 4,653,538 A | | 3/1987 | Tsutsui et al. |
| 5,025,983 A | * | 6/1991 | Akita ........................ 236/12.2 |
| 5,129,576 A | * | 7/1992 | Pullen et al. .............. 236/12.2 |
| 5,340,018 A | | 8/1994 | MacDonald |
| 5,931,374 A | | 8/1999 | Knapp |
| 6,364,210 B1 | * | 4/2002 | Lorch ........................ 236/12.2 |

FOREIGN PATENT DOCUMENTS

| DE | 28 41 998 | 4/1980 |
| DE | 28 41 998 | 3/1984 |
| DE | 196 48 114 | 5/1998 |
| DE | 199 01 851 | 7/2000 |
| EP | 0 392 441 | 4/1990 |

OTHER PUBLICATIONS

Copy of International Search Report.
Copy of European Search Reprot.

\* cited by examiner

*Primary Examiner*—William E. Tapolcai
(74) *Attorney, Agent, or Firm*—Duane Morris LLP

(57) ABSTRACT

A cartridge intended for insertion in a sanitary fitting contains a control disk rotated with respect to a fixed distributor disk. The cartridge contains a thermostatic valve. The disk control formed by the two disks constitutes both a quantity control and a switching device between at least two and preferably three outlets.

9 Claims, 5 Drawing Sheets

CARTRIDGE FOR SANITARY APPLIANCES

Figure 1:
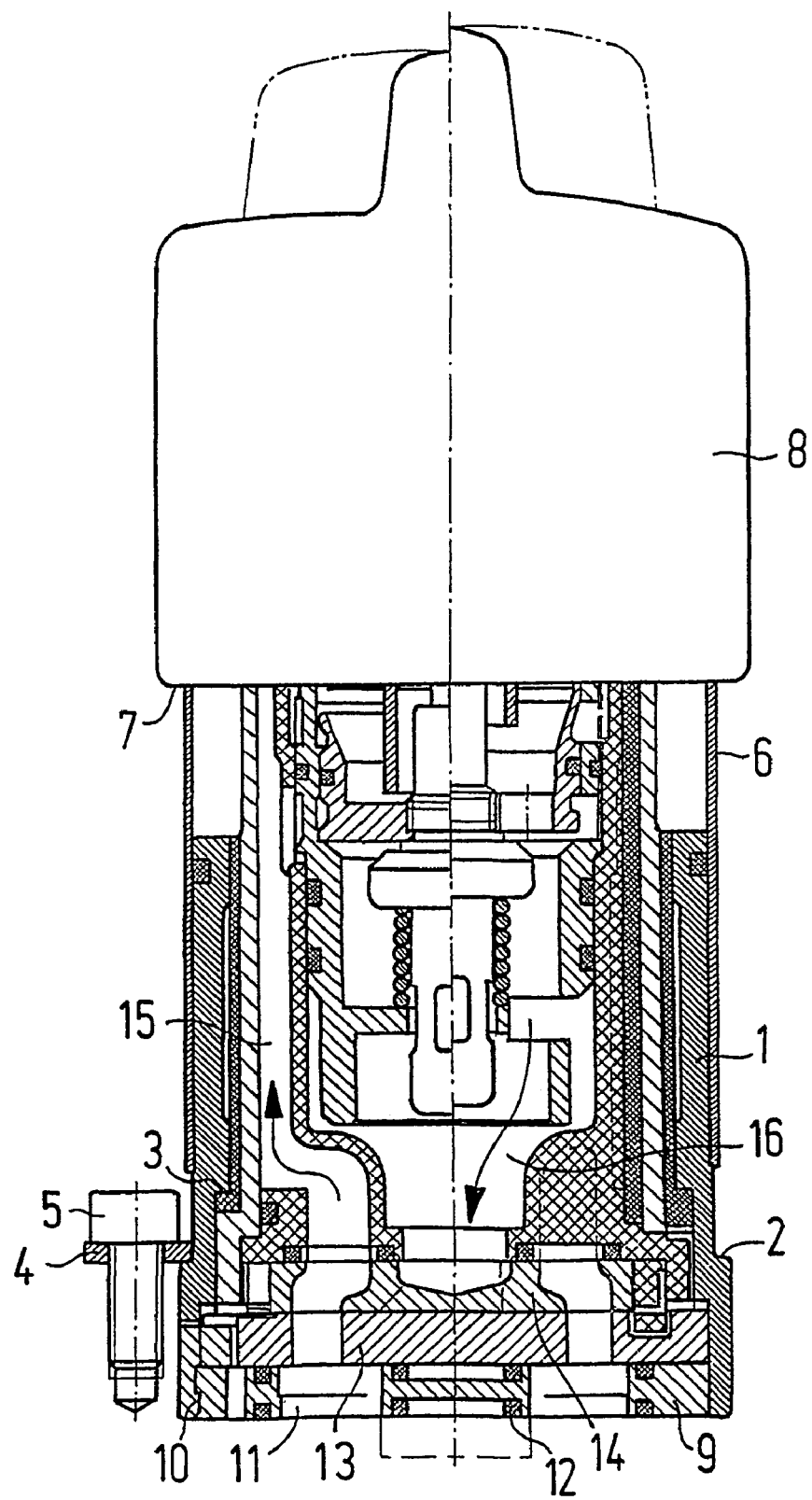

The invention is directed at a cartridge for a sanitary fitting. It is known to house the control elements for sanitary fittings in cartridges, which are self-contained. The cartridges normally contain a housing closed by a base. The base forms the liquid connections between the interior of the cartridge and the water passages of the fitting housing. The fitting housing is designed in such a way as to contain a receptacle for such a cartridge housing.

A cartridge for sanitary fittings is already known (DE 19901851). In the case of said cartridge a disk control is provided, whose control disk is rotated with the aid of a distributor housing.

The problem of the invention is the creation of a cartridge which, in a confined space offers different use possibilities.

Thus, the cartridge contains a cartridge housing and a disk control located therein. The cartridge additionally contains a switching device in order to switch the water flowing into and then out of said cartridge again between at least two different outlets. The switching device can be designed in such a way that the two outlets can only be completely separated from one another, or also in such a way that a certain overlap of the two outlets is possible.

In particular and according to a further development of the invention the switching device is integrated into the disk control. This means a simple construction of the cartridge and at the same time a limited space requirement.

According to a further development of the invention the outlet openings for the at least two different outlets in the distributor disk of the disk control are located within a circle and the inlet openings for the hot and cold water are located outside said circle. Obviously the reverse arrangement is possible. This makes it possible to bring about an easy separation of the different water passages.

According to a further development of the invention the outlet openings in the distributor disk are constructed as circular sectors.

The inlet openings for the hot and cold water in the distributor disk are constructable as arcuate slots having a constant width.

In the case of a control comprising two disks, the term distributor disk is understood to mean the control disk arranged in fixed manner in the cartridge housing, whereas the movable control disk is called the control disk.

According to the invention the inlet openings in the control disk and which lead into the cartridge water passages are constructed as arcuate slots, whose edges coincide with the edges of the inlet openings in the distributor disk.

It is possible for the arc length of the inlet openings in the control disk to be twice as large as the arc length of the inlet openings in the distributor disk. Thus, even in the case of a greater rotation of the control disk, it is possible to produce and maintain a connection with the inlet openings.

According to the invention the control disk can have two separate outlet openings, which are connected within or upstream of the control disk, so that the two outlet openings of the movable control disk are connected to a single water passage within the cartridge. Thus, both outlet openings are simultaneously subject to the action of the water leaving the cartridge.

It is also possible for the two outlet openings of the control disk to be in the form of circular sectors. The sector angle of the circular sectors is preferably approximately 45°.

According to a further development of the invention the inlet openings in the control disk lead to a thermostatic valve in the cartridge and whose outlet carrying mixed water is connected to the outlet opening of the control disk.

According to the invention the outlet openings of the control disk have the same size and shape as the outlet openings of the distributor disk.

The cartridge proposed by the invention can be used to place the outlet of a thermostatic valve on a head shower, a hand shower and a side shower or to switch between the same. The disk control simultaneously contains a quantity control for the different outlets. The cartridge can be constructed in such a way that it opens the different outlets from a neutral position by turning to the right or left. The neutral position is that in sectional view of FIG. 1. The cartridge is so constructed in the embodiment shown that through the channel 15 and a corresponding further channel, the hot or cold water flows to a thermostatic valve from which it then passes as mixed water through the channel 16 back to the disk control.

Figure 2A:
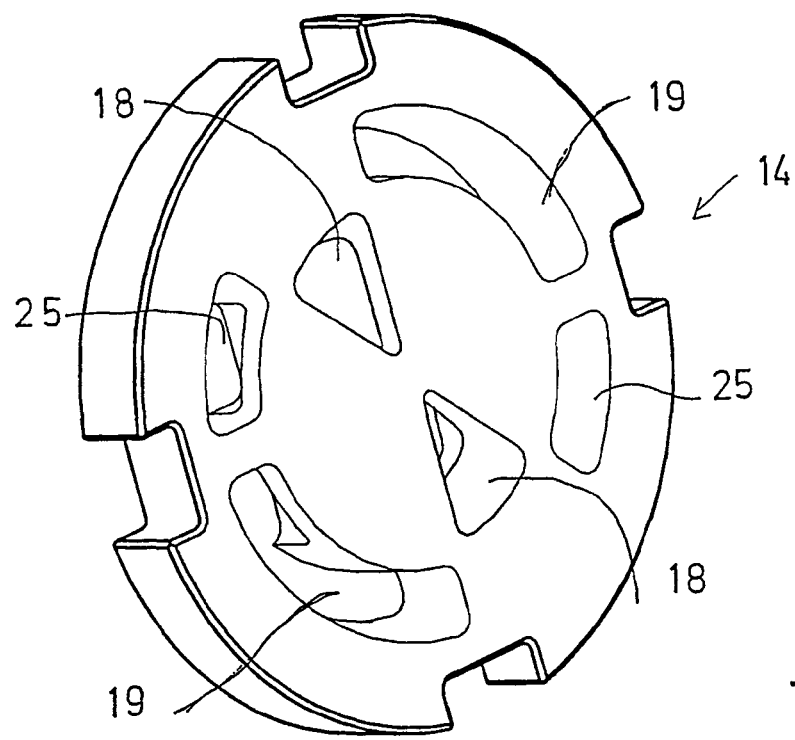
Figure 2B:
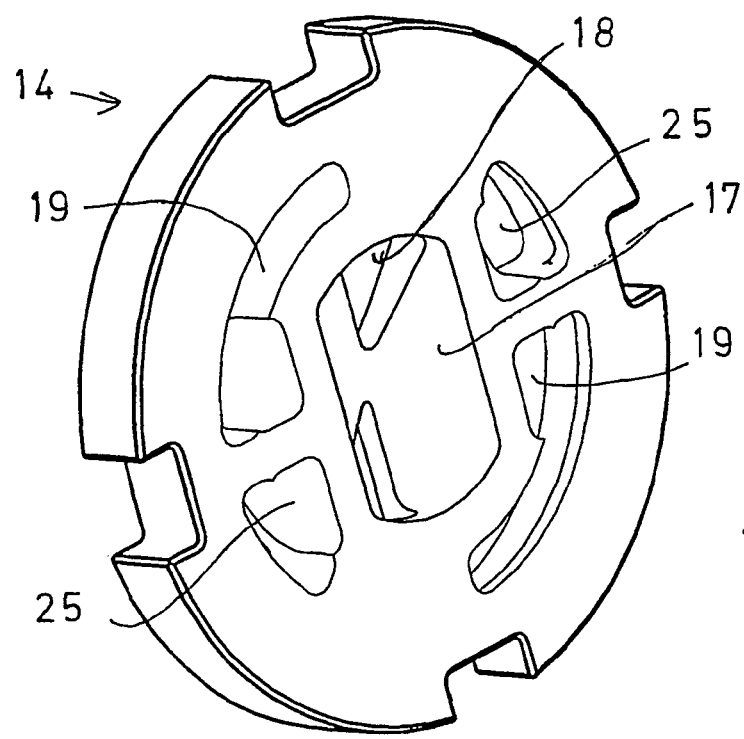

FIGS. 2*a* and 2*b* perspectively show the movable control disk 14 in upwardly or downwardly sloping manner. Said control disk 14 contains a central opening 17 issuing in the underside as a single opening, but which in the facing top side located in the control surface forms two separate outlet openings 18 with in each case a closed circumference. Through the control disk extend two openings 19 in the form of arcuate slots with a constant width in the embodiment shown. Both the outside and the inside of both openings are in each case on a circular cylinder about the centre of the disk 14.

FIGS. 3 to 6 diagrammatically show the reciprocal arrangement of the distributor disk 13 and the movable control disk 14 located thereon, the outlines of the openings being shown in their form in the control surface, i.e. the plane in which the movable control disk 14 is located on the distributor disk 13.

In the distributor disk are formed three outlet openings 20, 21, 22, which in each case are in the form of a circular sector with a sector angle of approximately 45°. Their arcuate circumference is located on a circle with a first radius.

Outside said circle and in diametrically facing manner are formed two inlet openings 23, 24, whereof one is the inlet opening for cold water and the other the inlet opening for hot water. Through the separation of the locations of the inlet openings 23, 24 and outlet openings 20 to 22, no water can flow directly from the inlet openings into the outlet openings.

Figure 3:
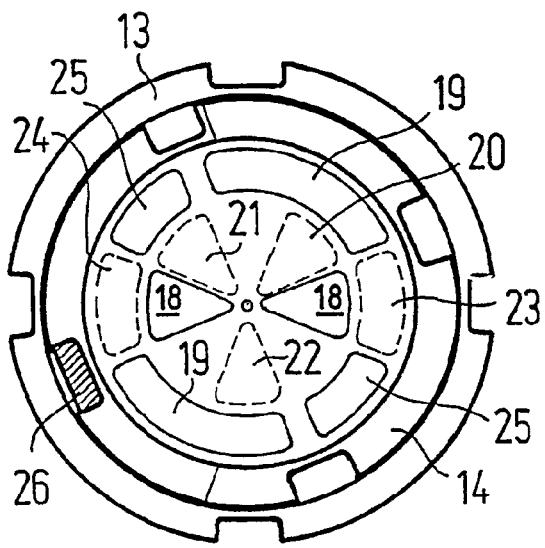

The control disk 14 has two diametrically positioned, arcuate inlet openings 19, which are constructed as arcuate slots. Their edges, i.e. the outer edge and the inner edge, are located on the same circle as the outer edge and inner edge of the inlet openings 23, 24 of the distributor disk 11, but the arc length thereof is somewhat greater. To the said two arcuate slots are connected two further arcuate inlet openings 25, which have the same width and arrangement, but a shorter arc length. As can be gathered from FIG. 3, there is no overlap of openings in this position. The two separate outlet openings 18 of the control disk 14 are also located in such a way as not to coincide with the outlet openings 20, 21, 22. Thus, FIG. 3 shows the cartridge in the closed position.

If with the aid of the grip 8 the control disk is now rotated which the valve is closed.

Further features, details and advantages of the invention can be gathered from the following description of a preferred embodiment and the attached drawings, wherein show:

FIG. 1 Diagrammatically the arrangement of a thermostatic valve in longitudinal section.

FIG. 2a/b Perspectively the upper or lower side of the movable control disk of a disk control.

FIGS. 3 to 6 Diagrammatically the cooperation of the disk control in a first embodiment in four different positions.

FIGS. 7 to 10 Representations of the different positions in a second embodiment.

FIGS. 11 to 14 In greatly simplified form different positions in a further embodiment.

FIG. 1 shows in an axial section through the axis of the fitting the structure of a cartridge according to the invention. The cartridge contains a cartridge housing 1 constructed as a cylindrical sleeve. It has on both its outside and its inside a shoulder 2, 3. With the aid of the outer shoulder 2 it is possible to fix the cartridge housing 1 in a fitting body, e.g. with the aid of a plate 4, which is screwed down with a screw 5, which is shown diagrammatically to the left and at the bottom of FIG. 1. The cartridge housing 1 is surrounded by a protective sleeve 6, which optically covers the cartridge. The protective sleeve 6 extends below the edge 7 of a control grip 8 used for operating the cartridge.

The cartridge housing 1 is closed by a cartridge base 9, which is secured in the cartridge housing with the aid of locking tongues 10. The cartridge base contains through openings 11 surrounded by seals 12. It produces the connection to openings in the fitting housing.

Figure 4:
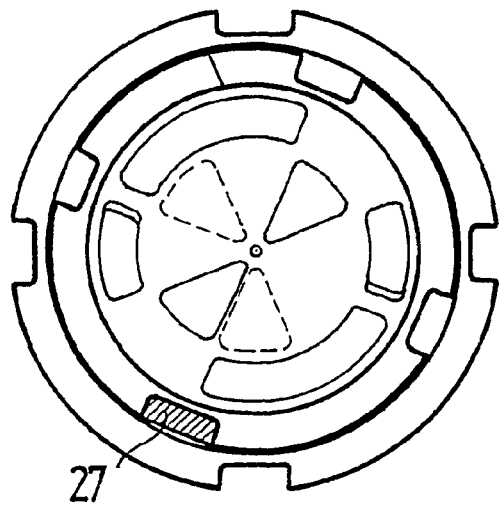

Above the cartridge base the cartridge housing 1 contains a fixed control disk 13, also called a distributor disk and which is normally made from ceramic material. Its top surface remote from the cartridge base 9 forms the control surface on which rests flat a movable control disk 14. Through openings pass through the fixed distributor disk 13 and the movable control disk 14 and will be described in detail hereinafter. The openings in the control disk 14 are connected to channels 15, 16 leading to the water passage within the cartridge. A further water passage cannot be seen in the counterclockwise from the position of FIG. 3, gradually the control disk inlet openings 25 come into coincidence with the distributor disk inlet openings 23, 24 and simultaneously one of the two outlet openings 18 coincides with the distributor disk outlet opening 20 leading to the hand shower. This position is shown in FIG. 4. Simultaneously a stop 26 connected to the control disk engages on a housing stop 27.

Figure 5:
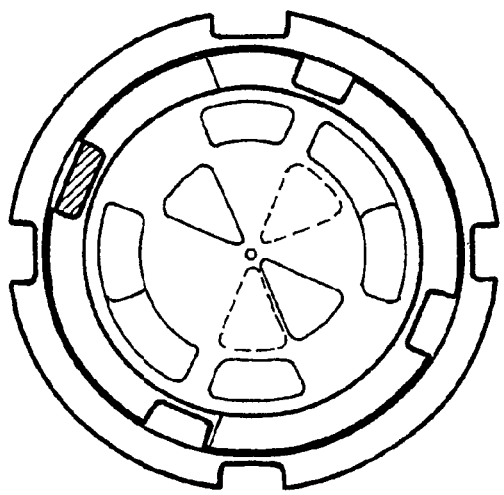
Figure 6:
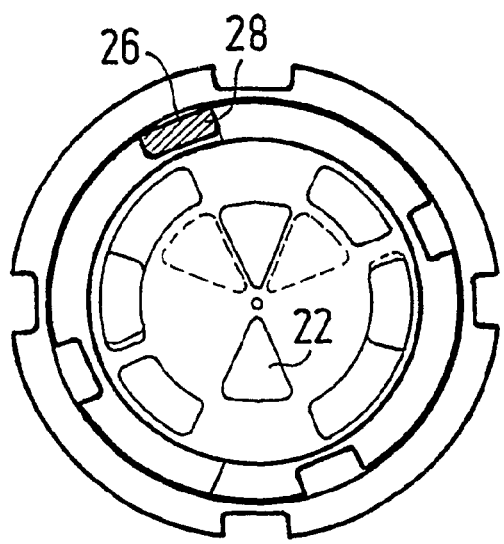

If, however, the control disk 14 is rotated clockwise from the neutral position of FIG. 3, firstly the position of FIG. 5 is reached in which the inlet openings 23, 24 are connected to the control disk inlet openings 19 and simultaneously one of the outlet openings 18 is connected to a distributor disk outlet opening 22 leading to a side shower. If the control disk is again rotated clockwise the position of FIG. 6 is reached, where now one of the outlet openings 18 of the control disk 14 is connected with the outlet opening 22 of the distributor disk e.g. leading to the head shower. This position is also bounded by the engagement of stop 26 on counter surface 28.

Figure 7:
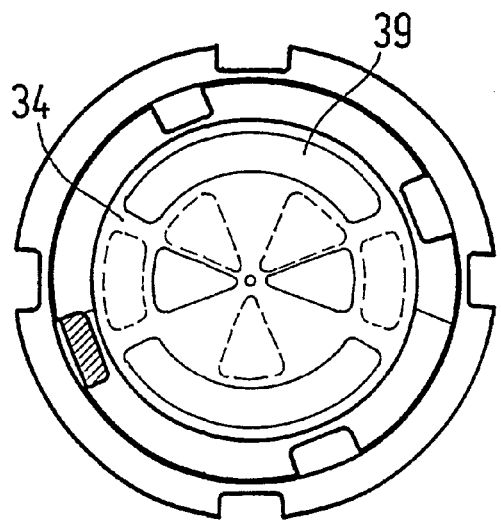
Figure 8:
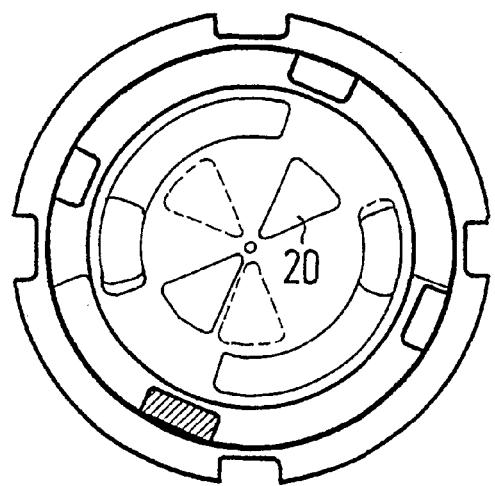
Figure 9:
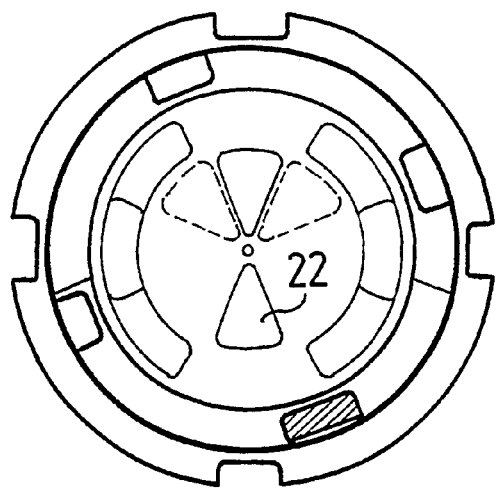

Whereas in the embodiment of FIGS. 3 to 6 the neutral and therefore closed position is between two opening positions, FIGS. 7 to 10 show corresponding positions for an embodiment in which the closed and neutral position according to FIG. 7 is at one end of a movement path. In place of the two successively arranged inlet openings 19, 25, in the case of the control disk 34 of the embodiment of FIGS. 7 to 10 there is a through inlet opening 39. In the position of FIG. 7 there is no coincidence of the outlet openings and inlet openings. If the control disk 34 is turned counterclockwise, a coincidence occurs between the inlet openings 23, 24 and inlet openings 39 of the control disk, as well as a coincidence of one of the outlet openings 18 of the control disk 34 with the outlet opening 20 leading to the hand shower.

On further counterclockwise rotation there is a coincidence with the other control disk outlet opening 18 and the outlet opening 22 leading to the head shower.

Figure 10:
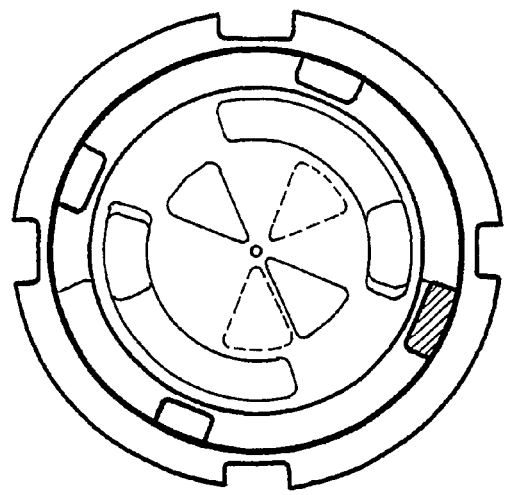

On further rotation the position of FIG. 10 arises, where the side shower is connected in.

Figures 11, 12, 13, 14:
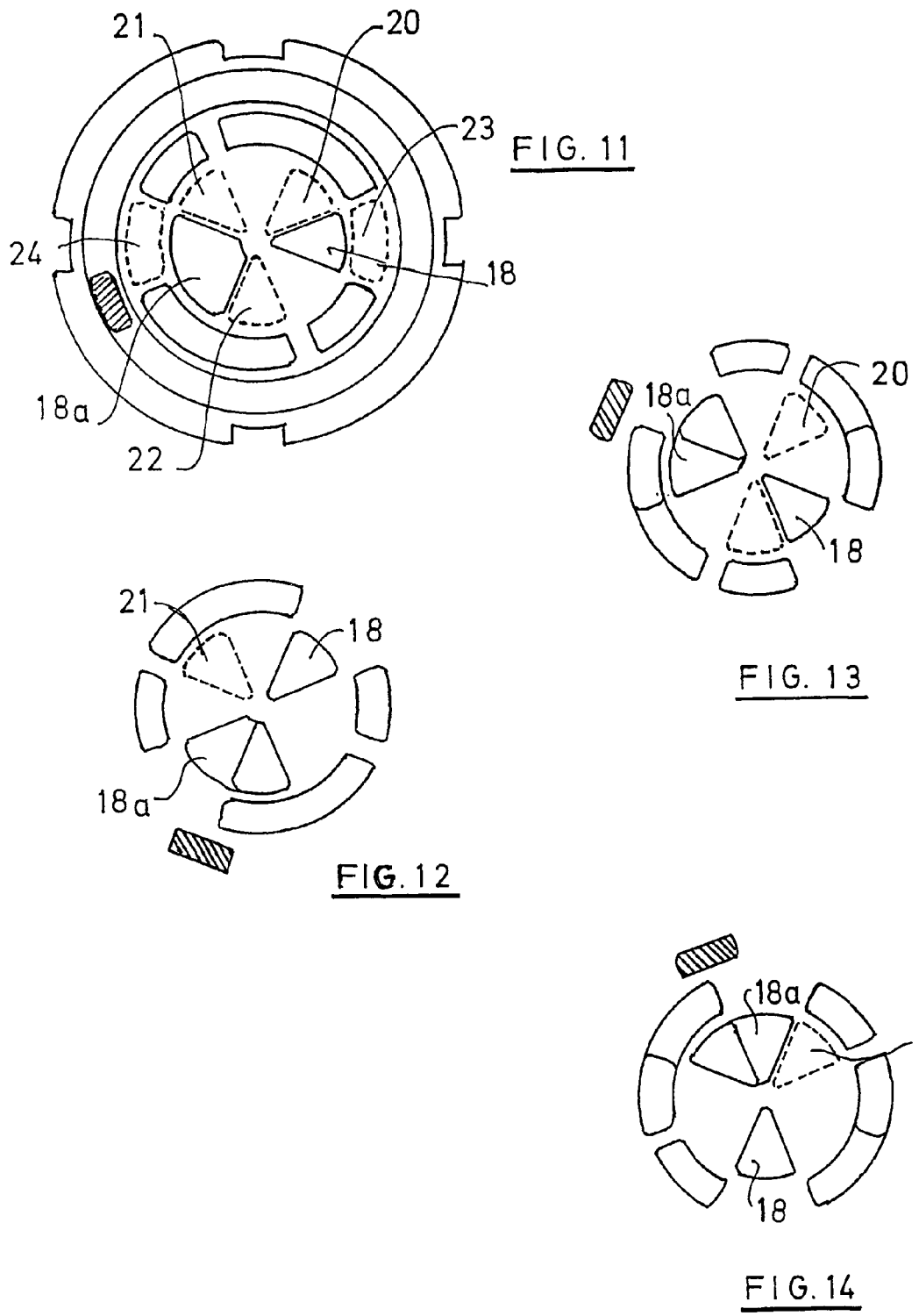

FIG. 11 corresponds to FIG. 3, where the movable control disk also has two outlet openings 18, 18a, whereof one 18a extends over a larger circular sector than the other. FIG. 11 shows the position in which the radially further outwardly located inlet openings 23, 24 and also the outlet openings 20, 21, 22 of the fixed control disk are closed. If now the movable control disk is rotated counterclockwise according to FIG. 12, one outlet opening 22 of the fixed control disk is made to coincide with the outlet opening 18a of the movable control disk and simultaneously the second outlet opening 18 is made to coincide with the outlet opening 20 of the fixed control disk. Thus, now the water flows outwards through the openings 20 and 22.

However, if the movable control disk is rotated clockwise from the closed position of FIG. 11 into that of FIG. 13, the opening 21 in the fixed control disk is opened, so that the water can now flow out of a second outlet from the mixer cartridge. In FIG. 12 e.g. a hand shower is connected in and in FIG. 13 another shower. On further rotating clockwise the position of FIG. 14 arises, where both the opening 21 and the opening 22 of the fixed control disk are connected to the inlet openings. Here both the showers are simultaneously in operation.

What is claimed is:

1. A cartridge for sanitary fittings, comprising:
   a cartridge housing;
   a disk control located in the cartridge housing, the disk control having a movable control disk and a fixed control disk, the fixed control disk being a distributor disk;
   a switching device for switching between at least two different outlets, wherein the switching device is integrated into the disk control, and wherein the movable control disk has two separate outlet openings that are one of interconnected within the movable control disk and upstream of the movable control disk.

2. The cartridge according to claim 1, wherein the distributor disk has outlet openings for different outlets, said outlet openings being located within a circle, and inlet openings for hot and cold water, said inlet openings being located outside said circle.

3. The cartridge according to claim 2, wherein the outlet openings in the distributor disk are constructed as circular sectors.

4. The cartridge according to claim 2, wherein the inlet openings in the distributor disk are constructed as arcuate slots of constant width.

5. The cartridge according to claim 1, wherein the movable control disk has inlet openings constructed as arcuate slots, whose edges coincide with edges of the inlet openings in the distributor disk.

6. The cartridge according to claim 5, wherein an arc length of the inlet openings in the movable control disk are constructed as arcuate slots, whose edges coincide with the edges of the inlet openings in the distributor disk.

7. The cartridge according to claim 1, wherein the two outlet openings of the movable control disk have a circular sector shape.

8. The cartridge according to claim 1, wherein inlet openings in the movable control disk lead to a thermostatic valve positioned in the cartridge and whose outlet is connected to one of the outlet openings of the movable control disk.

9. The cartridge according to claim 2, wherein the outlet openings of the movable control disk have a same size and shape as the outlet openings of the distributor disk.

* * * * *